United States Patent
Donaldson et al.

(10) Patent No.: US 9,759,093 B2
(45) Date of Patent: Sep. 12, 2017

(54) TURBOMACHINE BEARING ASSEMBLY PRELOADING ARRANGEMENT

(71) Applicant: Cummins Ltd, Huddersfield (GB)

(72) Inventors: James Donaldson, Huddersfield (GB); Prabhu Ramasamy, Peterborough (GB); Paul Brierley, Brighouse (GB)

(73) Assignee: Cummins Ltd., Huddersfield (GB)

( * ) Notice: Subject to any disclaimer, the term of this patent is extended or adjusted under 35 U.S.C. 154(b) by 468 days.

(21) Appl. No.: 14/076,346

(22) Filed: Nov. 11, 2013

(65) Prior Publication Data

US 2014/0133978 A1    May 15, 2014

(30) Foreign Application Priority Data

Nov. 12, 2012   (GB) .................................. 1220300.6

(51) Int. Cl.
| | | |
|---|---|---|
| *F01D 25/16* | (2006.01) | |
| *F02C 6/12* | (2006.01) | |
| *F01D 25/18* | (2006.01) | |

(52) U.S. Cl.
CPC ............ *F01D 25/16* (2013.01); *F01D 25/18* (2013.01); *F02C 6/12* (2013.01); *F05D 2220/40* (2013.01); *F05D 2240/50* (2013.01); *F05D 2240/60* (2013.01)

(58) Field of Classification Search
CPC ......... F01D 25/18; F01D 25/16; F01D 25/162
See application file for complete search history.

(56) References Cited

U.S. PATENT DOCUMENTS

| | | | |
|---|---|---|---|
| 1,865,088 A | | 6/1932 | Daun et al. |
| 1,890,844 A | | 12/1932 | Delaval-Crow |
| 3,807,815 A | | 4/1974 | Kasabian |
| 4,240,678 A | * | 12/1980 | Sarle .................... F01D 25/166 |
| | | | 384/369 |
| 4,708,602 A | | 11/1987 | McEachern, Jr. et al. |
| 4,986,733 A | * | 1/1991 | Fleury .................... F01D 5/025 |
| | | | 403/361 |
| 6,368,077 B1 | * | 4/2002 | Meyerkord ............. F01D 11/02 |
| | | | 277/320 |

(Continued)

FOREIGN PATENT DOCUMENTS

| | | |
|---|---|---|
| CN | 101166913 A | 4/2008 |
| CN | 102213117 | 10/2011 |

(Continued)

OTHER PUBLICATIONS

European Search Report issued by the European Patent Office (Munich), dated Mar. 3, 2016 for related Application No. EP13191838.5; 9 pages.

(Continued)

*Primary Examiner* — Justin Seabe
(74) *Attorney, Agent, or Firm* — Faegre Baker Daniels LLP (57) ABSTRACT

A turbomachine with a shaft supporting a turbine wheel is supported for rotation in a housing. The shaft extends through a bore in the housing and a bearing assembly is disposed in the bore. The turbomachine has a first lubricating fluid slinger comprising a screw thread that is engageable with a threaded section of the shaft such that the first lubricating fluid slinger is screwable along the threaded section of the shaft so as to apply a compressive preload to the bearing assembly.

13 Claims, 3 Drawing Sheets

(56) References Cited

U.S. PATENT DOCUMENTS

| | | | | |
|---|---|---|---|---|
| 7,223,077 | B2* | 5/2007 | Nishiyama | F04D 29/266 416/204 A |
| 7,909,578 | B2* | 3/2011 | Nishiyama | F01D 5/025 416/204 A |
| 2007/0214785 | A1* | 9/2007 | Giselmo | F01D 25/16 60/598 |
| 2010/0037855 | A1* | 2/2010 | French | F01D 25/16 123/323 |
| 2011/0250067 | A1* | 10/2011 | Schlienger | F01D 11/003 415/230 |

FOREIGN PATENT DOCUMENTS

| | | |
|---|---|---|
| CN | 102213117 A | 10/2011 |
| DE | 102008056058 A1 | 2/2010 |
| GB | 2082271 A | 3/1982 |
| GB | 2175957 A | 12/1986 |
| WO | 2006/046891 A1 | 5/2006 |
| WO | WO 2013/104880 A1 | 7/2013 |

OTHER PUBLICATIONS

State Intellectual Property Office of the People's Republic of China, First Office Action for Chinese Patent Application No. 2013105596859 (related to above-captioned patent application), mailed Mar. 22, 2016.

European Patent Office, Extended European Search Report for European Patent Application No. 13191838.5 (related to above-captioned patent application), mailed Jul. 6, 2016.

Examination Report dated Mar. 22, 2016, issued by the State Intellectual Property Office of the People's Republic of China for related Application No. 2013105596859; 10 pages.

Examination Report dated Mar. 22, 2016, issued by the State Intellectual Property Office of the People's Republic of China (translated in English language) for related Application No. 2013105596859; 5 pages.

European Search Report issued by the European Patent Office (Munich), dated Jun. 28, 2016, for related Application No. EP 13191838.5; 15 pages.

\* cited by examiner

TURBOMACHINE BEARING ASSEMBLY PRELOADING ARRANGEMENT

CROSS-REFERENCE TO RELATED APPLICATION

This application claims priority to GB 1220300.6, filed Nov. 12, 2012, the disclosure of which is expressly incorporated herein by reference.

The present invention relates to a rotating machine such as, for example, a turbomachine with a bearing assembly preloading arrangement. The invention has particular, but not exclusive, application to a turbomachine in the form of a turbocharger or a power turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is supported by a central bearing housing disposed between the turbine and compressor wheels. The turbocharger shaft rotates within a bearing cartridge housed in an axial bore of the bearing housing.

The bearing cartridge has inner and outer races radially separated by bearing elements in the form of rollers, ball bearings, etc. The outer race is received in the axial bore of the bearing housing and is fixed against rotation, typically by means of a pin. The inner race is fixed to the turbocharger shaft by an interference fit.

In order to free the bearing cartridge, during disassembly of the turbocharger, the turbocharger shaft and the turbine wheel must first be removed from the bearing housing, specifically by pulling the shaft through the axial bore in the bearing housing.

Due to the interference fit of the shaft and bearing cartridge, this tends to pull the inner race with the shaft and so strip the inner race away from the rest of the bearing cartridge, resulting in damage to the cartridge. It is considerably expensive to replace a damaged bearing cartridge.

The same problem occurs with bearing assemblies that do not comprise a bearing cartridge but simply have inner and outer races radially separated by bearing elements.

A further problem is that some bearing assemblies, for example rolling element bearing (REB) assemblies, need to be preloaded in order to function and take any thrust loading. The compressor wheel is axially fixed along the turbocharger shaft by a compressor nut received on a threaded end of the shaft that extends beyond a hub of the compressor wheel. Preloading of the bearing elements is obtained by tightening the compressor nut on the shaft.

However, tightening the compressor nut also produces a tensile axial force on the turbocharger shaft, which acts to extend the shaft. This can result in increased axial slip of the compressor wheel during operation of the turbocharger. This can also result in rotation of the compressor wheel relative to the shaft, as the shaft rotates, resulting in a loss of useful work done and thereby a reduction in efficiency.

Whereas the turbine of a turbocharger drives a compressor, in a power turbine the end of the turbine shaft remote from the turbine wheel transmits power via a mechanical coupling. In a turbocompound engine two turbines are provide in series, with a power turbine connected in series with the turbine of a turbocharger. The power turbine is used to generate additional power and a gear wheel may be fixed to the end of the power turbine shaft in order to transmit that power to the crankshaft of the engine via an appropriate coupling (such as for example a fluid coupling or a gear or other drive mechanism), hydraulically, mechanically or electrically. As with a turbocharger, the shaft of a power turbine is supported on bearing assemblies. The bearing arrangement at the turbine end of the shaft may be substantially the same as that found in a turbocharger, although the bearing arrangement at the drive end of the shaft may be a ball bearing assembly.

It is an object of the present invention to overcome or mitigate the above problems.

According to a first aspect of the present invention there is provided a turbomachine comprising: a shaft rotatable about a rotational axis; a turbine wheel provided at one end of the shaft for rotation about the rotational axis within a turbine housing; the shaft being supported for rotation in a bearing housing by a bearing assembly, the bearing housing having a bore through which the shaft extends, the bearing assembly being disposed in the bore, wherein the turbomachine further comprises a first lubricating fluid slinger arranged to rotate with the shaft and comprising a slinging formation arranged to propel a lubricating fluid away from the shaft as the shaft rotates, the shaft comprising a threaded section and the first lubricating fluid slinger comprising a screw thread that is engageable therewith such that the first lubricating fluid slinger is screwable along the threaded section of the shaft from a first position to a second position and wherein when the first lubricating fluid slinger is in the second position, it acts to compress the bearing assembly.

Preferably an area of the turbomachine that surrounds the first lubricating fluid slinger is recessed to define a chamber for capturing lubricating fluid that is propelled from the shaft by the first lubricating slinger. Preferably the chamber is fluidly connected by a drain to a lubricating fluid sump.

Preferably the first lubricating fluid slinger is provided with a sealing arrangement to provide a seal between the first lubricating fluid slinger and a radially adjacent surface of the turbomachine, within which the first lubricating fluid slinger rotates.

Preferably the threaded section of the shaft, and the first fluid lubricating slinger, are provided on an opposite side of the bearing assembly to the turbine wheel. Alternatively, the threaded section of the shaft, and the first fluid slinger may be provided on the same side of the bearing assembly as the turbine wheel.

The first lubricating fluid slinger may directly contact the bearing assembly when it is in the second position. Alternatively, at least one intermediary member may be provided between the first lubricating fluid slinger and the bearing assembly such that when the first lubricating fluid slinger is in the second position, the at least one intermediary member contacts the bearing assembly and transmits the compressive force of the first lubricating fluid slinger to the bearing assembly.

Preferably the turbomachine comprises an abutment member arranged such that when the first lubricating slinger is in the second position, the abutment member acts with the first lubricating slinger to compress the bearing assembly. Preferably the abutment member is arranged such that when the first lubricating fluid slinger is in the second position, the bearing assembly is compressed between the first lubricating fluid slinger, or the at least one intermediary member, and the abutment member, as appropriate.

As stated above some bearing assemblies, for example rolling element bearing (REB) assemblies, need to be preloaded in order to function and resist any thrust loading. The present invention is advantageous in that the first lubricating fluid slinger can be screwed from the first position, to the second position, in order to preload the bearing assembly. This removes the need to preload the bearing assembly by tightening a compressor wheel nut on the shaft, or allows the compressor nut to be tightened less. Accordingly, the above mentioned problem of unwanted axial extension of the shaft, which can result in axial slip of the compressor wheel during operation, is avoided.

Preferably the first lubricating fluid slinger is rotationally fixed to the shaft when it is in the second position.

The abutment member may be fixed relative to the bearing housing. Alternatively, the abutment member may be rotationally fixed relative to the shaft. In this case, the abutment member may be integral to the shaft or may be a separate component that is attachable to the shaft, for example by welding, an interference fit, or any other suitable means of attachment. The abutment member may be an outward radial protrusion on the shaft.

The first lubricating fluid slinger is preferably provided at one end of the bearing assembly, with the abutment member provided at an opposite end of the bearing assembly.

The turbomachine may comprise a second lubricating fluid slinger. In this case, the second lubricating fluid slinger may form the abutment member. The second lubricating fluid slinger may comprise a section of increased diameter that forms said abutment member.

Preferably when the lubricating fluid slinger is in the second position, the bearing assembly is rotationally fixed relative to the shaft by a transition fit. Where the first lubricating fluid slinger directly contacts the bearing assembly, when it is in the second position, preferably the clamping of the bearing assembly between the first lubricating fluid slinger and the abutment member allows for this transition fit. Where said at least one intermediary member is provided between the first lubricating fluid slinger and the bearing assembly, preferably the clamping of the bearing assembly between the at least one intermediary member and the abutment member allows for this transition fit.

This is advantageous in that it allows the bearing assembly to be rotationally fixed relative to the shaft by a transition fit, thereby removing the need to use an interference fit between the bearing assembly and the shaft. Accordingly, in order to disassemble the turbomachine, the shaft can be slid easily out of the bearing assembly without damaging the bearing assembly.

The bearing assembly may comprise inner and outer races radially separated by bearing elements. The bearing elements may be in the form of rollers, ball bearings, etc. Preferably the bearing elements are rolling element bearings. The bearing assembly may comprise a cartridge. The cartridge may form the outer race. The bearing assembly may be an angular contact ball bearing assembly.

Preferably when the first lubricating fluid slinger is in the second position, it acts to compress the inner and/or outer race of the bearing assembly. Preferably, when the first lubricating fluid slinger is in the second position, the inner and/or outer race of the bearing assembly is compressed between the first lubricating fluid slinger, or the at least one intermediate member, and the abutment member, as appropriate.

Preferably one of the inner or outer race of the bearing assembly is axially fixed relative to the bearing housing and when the first lubricating fluid slinger is in the second position, it acts to compress the other of the inner or outer race of the bearing assembly. In this case, when the first lubricating fluid slinger is in the second position, the inner or outer race of the bearing assembly is preferably compressed between the first lubricating fluid slinger, or the at least one intermediary member, and the abutment member, as appropriate.

The turbomachine may comprise a thrust plate. Preferably the thrust plate is arranged to restrain axial movement of the bearing assembly. Preferably a radially inner surface of the thrust plate defines a bore through which the shaft passes. Preferably the first lubricating fluid slinger is mounted on the shaft such that a section of the lubricating fluid slinger is received within the bore of the thrust plate and the radially inner surface of the thrust plate that defines the bore forms a close radial fit with the lubricant fluid slinger.

The inner surface of the thrust plate that defines said bore preferably forms a non-contact seal with the first lubricating fluid slinger. This is advantageous in that the non-contact seal prevents lubricating fluid passing from the bearing assembly through the thrust plate.

The inner or outer race is preferably housed between the thrust plate and a surface of the bearing housing such that it is axially fixed relative to the bearing housing.

Preferably the first lubricating fluid slinger is releasably attachable to the shaft. This is advantageous in that the first lubricating fluid slinger can be removed from the shaft so as to permit removal of the shaft from the bearing assembly, as explained above.

The first lubricating fluid slinger preferably has a generally annular cross-sectional shape and extends in an axial direction.

The first lubricating fluid slinger preferably comprises an internal bore for receiving the shaft. The bore preferably extends in the axial direction of the first lubricating fluid slinger. The bore is preferably provided with said screw thread.

The internal bore of the slinger and the shaft are preferably dimensioned to form a close fit, so as to prevent lubricating fluid passing through the interface between the shaft and the bore.

The slinging formation preferably comprises a radially outward protrusion provided on an outer surface of the first lubricating fluid slinger. Preferably the protrusion is generally annular.

The threaded section of the shaft is preferably provided on an outer surface of the shaft.

The shaft preferably increases in diameter along its length to form a lip and the bore of the first lubricating fluid slinger increases in diameter along its length to form a shoulder, with the bore and shoulder forming a limiting abutment so as to prevent over compression of the bearing assembly by the first lubricating fluid slinger.

The increase in diameter of the shaft and bore is preferably a step increase in diameter. Preferably the lip extends substantially perpendicular to the axis of the shaft. Preferably the lip is generally annular. Preferably the shoulder extends substantially perpendicular to the axis of the shaft. Preferably the shoulder is generally annular. Preferably the shoulder and the lip of form opposed surfaces.

Preferably the limiting abutment prevents the first lubricating fluid slinger being screwed along the threaded section of the shaft past a predetermined position along the shaft. In the event that the first lubricating fluid slinger is over tightened, the abutment of the lip and shoulder acts to transfer the extra load to the shaft rather than to the bearing assembly.

In addition, the step change in the diameter of the shaft and bore is advantageous in that it presents a tortuous, stepped, interface between the shaft and bore, which acts to prevent lubricating fluid from travelling along the interface, through the first lubricating fluid slinger.

The shaft preferably increases in diameter towards one end of the bearing assembly. Preferably the internal bore of the first lubricating fluid slinger increases in diameter towards an end of the first lubricating fluid slinger that is proximal to the bearing assembly, when the first lubricating fluid slinger is in the second position. Where the first lubricating fluid slinger directly contacts the bearing assembly, when it is in the second position, said end of the first lubricating fluid slinger is preferably the end which contacts the bearing assembly. This is advantageous in that it presents the tortuous, stepped, interface at the point of contact with the bearing assembly, i.e. where lubricating fluid is first likely to meet the first lubricating fluid slinger.

Preferably when the first lubricating fluid slinger is in the second position, the bearing assembly is compressed in a direction that is substantially in the axial direction of the shaft.

Preferably when the first lubricating fluid slinger is in the first position, the first lubricating fluid slinger does not act to compress the bearing assembly, or it acts to compress the bearing assembly less than when the first lubricating fluid slinger is in the second position.

The lubricating fluid is preferably oil. However, it will be appreciated that the lubricating fluid slinger may be used with any suitable lubricating fluid.

The turbomachine may be a turbocharger in which case a compressor impeller wheel is preferably mounted to the other end of the shaft for rotation about said axis within a compressor housing. In this case, the slinging formation is preferably arranged to rotate in close relationship to the compressor housing so as to prevent lubricating fluid passing into compressor housing.

Preferably a compressor housing back plate is provided between the bearing housing and the impeller wheel.

Preferably the compressor back plate has an inner surface which defines a bore, through which the shaft passes, wherein a section of the first lubricating fluid slinger is received within the bore and the inner surface that defines said bore forms a close radial fit with said section of the first lubricating fluid slinger.

This is advantageous in that the close radial fit prevents lubricating fluid passing through the compressor back plate and into the compressor housing. The close radial fit preferably forms a non-contact seal.

Preferably an area of the compressor housing back plate that surrounds the first lubricating fluid slinger is recessed to define a chamber for capturing lubricating fluid that is propelled from the shaft by the first lubricating slinger. Preferably the chamber is fluidly connected by a drain to a lubricating fluid sump.

Preferably the turbomachine further comprises a compressor wheel nut which is threaded onto a second threaded section of the shaft, to constrain axial motion of the compressor wheel along the shaft, and is screwable along said second threaded section of the shaft from a first position to a second position and wherein when the compressor wheel nut is in the second position, it acts to compress the bearing assembly.

This compression may be achieved by direct contact of the compressor wheel, or a section of the shaft, or at least one intermediary member with the bearing housing. Preferably the bearing assembly is compressed between the abutment member and the first lubricating fluid slinger.

Accordingly, preloading of the bearing assembly may be achieved by tightening the first lubricating fluid slinger in addition, or separately, to tightening the compressor wheel nut.

According to a second aspect of the present invention there is provided a lubricating fluid slinger for use in a turbomachine comprising a slinging formation arranged to propel a lubricating fluid away from a shaft of a turbomachine, as the shaft rotates, and wherein the lubricating fluid slinger comprises a screw thread.

The lubricating fluid slinger preferably comprises an internal bore for receiving a shaft of a turbomachine. The bore preferably extends in the axial direction of the lubricating fluid slinger. The internal bore is preferably provided with said screw thread.

The lubricating fluid slinger preferably has a generally annular cross-sectional shape and extends in an axial direction.

The slinging formation preferably comprises a radially outward protrusion provided on an outer surface of the first lubricating fluid slinger. Preferably the protrusion is generally annular.

All of the features described herein may be combined with any of the above aspects, in any combination.

A specific embodiment of the present invention will now be described, by way of example only, with reference to the accompanying drawings in which.

Referring now to the drawings, the illustrated turbocharger comprises a turbine 1 connected to a compressor 2 via a central bearing housing 3. The turbine 1 comprises a turbine wheel 4 that rotates within a turbine housing (not shown). Similarly, the compressor 2 comprises a compressor impeller wheel 6 that rotates within a compressor housing (not shown). The compressor impeller is fixed to the shaft by an impeller nut 106. The turbine wheel 4 and compressor impeller 6 are mounted on opposite ends of a common turbocharger shaft 8 that extends through an axial bore 8a defined by an inner surface of the central bearing housing 3.

In use, the turbine wheel 4 is rotated by exhaust gas from an outlet manifold of an internal combustion engine. The exhaust gas flows from an inlet (not shown), provided in the turbine housing, to an exhaust gas outlet (not shown), also provided in the turbine housing. Rotation of the turbine wheel 4 in turn rotates the compressor impeller 6, which draws intake air through a compressor inlet (not shown), provided in the compressor housing, and delivers boost air to the inlet manifold of the internal combustion engine via an outlet volute (not shown), also provided in the compressor housing.

The turbocharger shaft 8 rotates within a bearing assembly 13 housed in the bore 8a of the bearing housing 3. Oil is fed to the bearing assembly 13 under pressure from the oil system of the engine via an oil inlet 15, gallery 16 and passages 17.

A first oil slinger 50 is mounted on the shaft 8 between the compressor impeller 6 and the bearing assembly 13 (as described below).

The turbine wheel 4 is connected to the turbocharger shaft 8 at an integrally formed seal boss 21, which extends through a turbine end 22 of the bore 8*a*. The boss 21 has a larger diameter than that of the remainder of the shaft 8, forming a shoulder 55 that projects radially outward from the remainder of the shaft 8.

The boss 21 is sealed with respect to the bore 8*a* by means of a piston ring 23 and groove combination. The piston ring 23 is supported by an annular wall 24 that defines the turbine end of the bore 8*a*. The piston ring 23 extends radially inwards into an annular groove 25 defined in the outer surface of the boss 21 so as to provide a seal.

Oil leakage, particularly at the compressor end of the turbocharger, is a problem as at low boost pressures (e.g. when the engine is idling or when the turbocharger is operated in engine braking mode) there can be a significant pressure drop from the bearing housing 3 to the compressor housing which encourages oil leakage into the compressor housing.

Axially in-board of the groove 25 the outer surface of the boss 21 has a recessed profile to define a second oil slinger 26. The second oil slinger 26 rotates with the turbocharger shaft 8 and its recessed outer surface is arranged to propel oil away from the shaft 8 as it rotates, in particular to prevent the oil from passing through the bearing housing 3 and into the turbine housing. The area of the bearing housing 3 that surrounds the second oil slinger 26 is recessed to define an annular chamber 27 that captures the dispersed oil and includes a drain.

A compressor housing back plate 29 is provided between the bearing housing 3 and the impeller wheel 6. The compressor housing back plate 29 separates the interior of the bearing housing 3 from the interior of the compressor housing.

The compressor back plate 29 has an inner surface which defines a bore 28, through which the shaft 8 and the first oil slinger 50 passes.

An annular thrust plate 34 is fixed relative to the bearing housing 3 and located between the compressor housing backplate 29 and the bearing assembly 13. The thrust plate 34 has a radial dimension that extends beyond that of the bearing assembly 13 and bears against a surface of the compressor housing back plate 29 at its outer periphery. In use, the thrust plate 34 is designed to resist axial thrust forces imparted by the bearing assembly 13.

The bearing assembly 13 is in the form of a cartridge having inner and outer rings 40, 41 that are radially separated by bearing elements 42. The two rings 40, 41 are axially elongated and have inwardly facing surfaces that each define a pair of axially spaced races 40, 41 for the bearing elements 42 having first and second ends 99, 100. In this instance, the bearing elements are in the form of spheres. However, it will be appreciated that other bearing element designs may be used such as, for example, rollers which may be cylindrical, barrel-shaped or tapered.

The outer race 41 is received in the bore 8*a* of the bearing housing 3 between the axial thrust plate 34 and an annular shoulder 39 formed by a radially inward projecting step 39 on the inner surface of bearing housing 3. By virtue of its housing, the outer race 41 is axially fixed relative to the bearing housing 3. The outer race 41 is rotationally fixed to the bearing housing 3 by means of a pin (not shown). The pin may be arranged to resist axial thrust forces imparted by the bearing take outer race 41. In this case, the pin may be used instead of the thrust plate.

Figure 1:
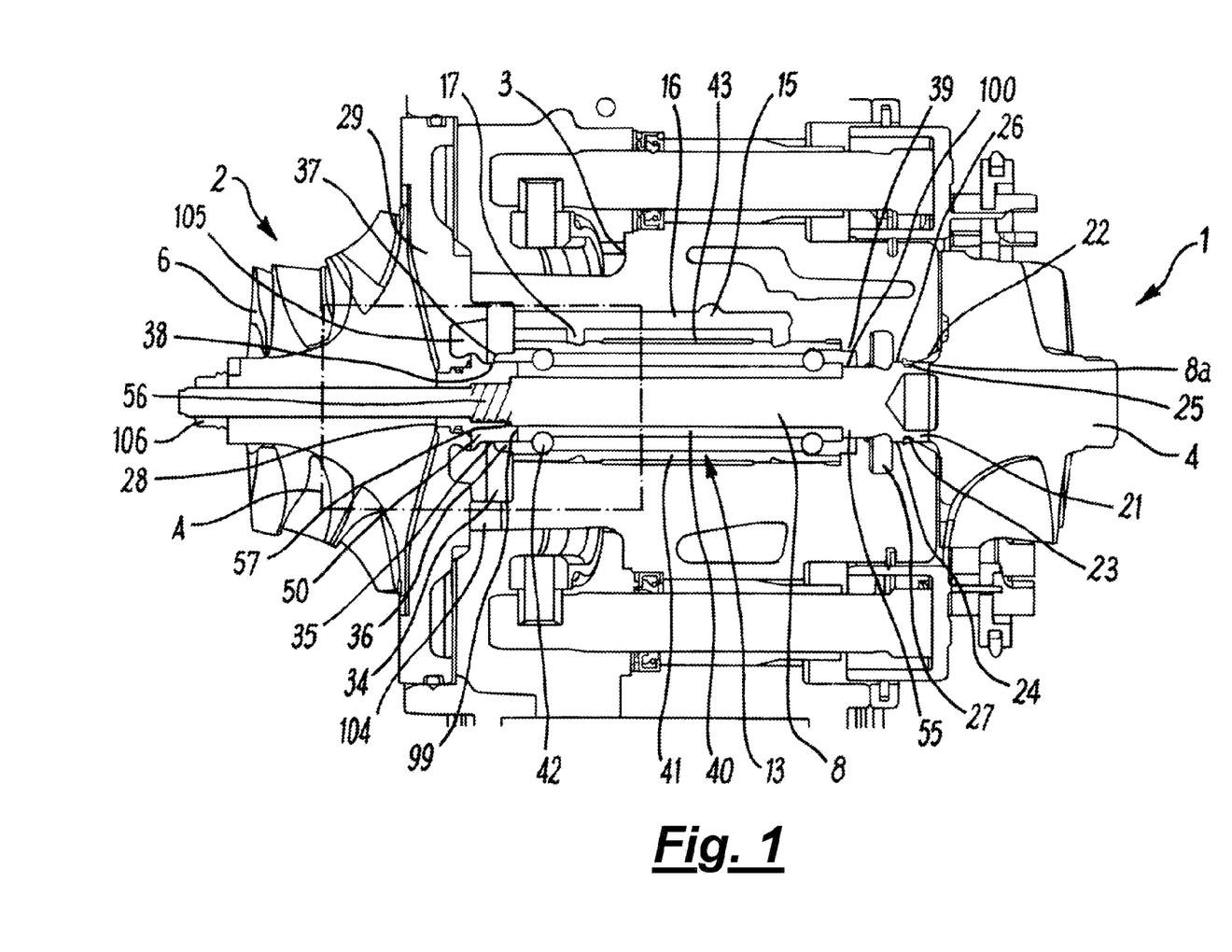
FIG. 1 is a sectioned view along the longitudinal axis of a turbocharger embodying the present invention.

The outer surface of the outer race 41 has a plurality of shallow annular recesses 43 for receipt of lubricating oil. These provide annular clearances between the inner surface of the bearing housing 3 and the outer surface of the bearing assembly 13 of around 0.03 mm or less. During operation of the turbocharger, oil is fed to the bearing assembly 13 under pressure from the oil system of the engine. The oil egresses from passages 17 and floods the recesses 43 so as to provide a thin film of oil between the outer race 41 of the bearing assembly 13 and the bearing housing 3. The film acts as a squeeze film damper and damps rotary motion and vibration caused by rotation of the shaft 8. From there the oil flows into the bearing assembly 13 through small holes (not shown) in the outer race 41. The outer race 41 is also provided with an oil outlet (not shown), which is fluidly connected to an oil sump 104 (see FIG. 1).

The inner race 40 is rotationally fixed to the shaft 8 as described below.

Immediately prior to entering the first end 99 of the inner race 40 of the bearing assembly 13, the shaft 8 undergoes a step increase in diameter to form an annular lip 57.

The shaft 8 is provided with a threaded section 56 which extends from the lip 57 along the section of the shaft of reduced diameter, i.e. towards the compressor side of the turbocharger, and terminates shortly after the shaft enters the thrust plate 34.

The first oil slinger 50 is mounted on the shaft 8 between the compressor impeller wheel 6 and the bearing assembly 13. In use, the first oil slinger 50 rotates with the shaft 8 and acts to propel oil radially outwards from the shaft 8, as it rotates. The area of the compressor housing backplate 29 that surrounds the first oil slinger 50 is recessed to define an annular chamber 105 that captures the dispersed oil and includes a drain 62 that is fluidly connected to the oil sump 104. This prevents the oil from entering the compressor housing.

Figure 2:
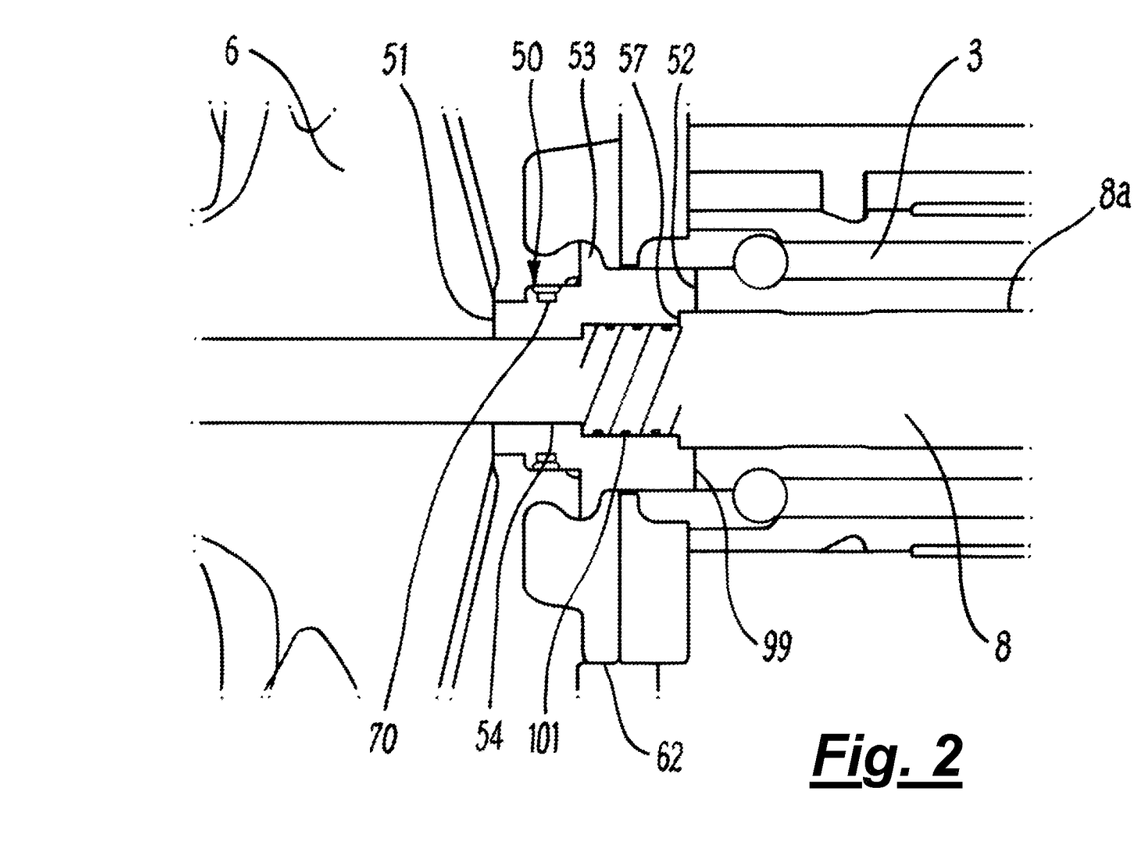
FIG. 2 is enlarged view of section A of FIG. 1.
Figure 3:
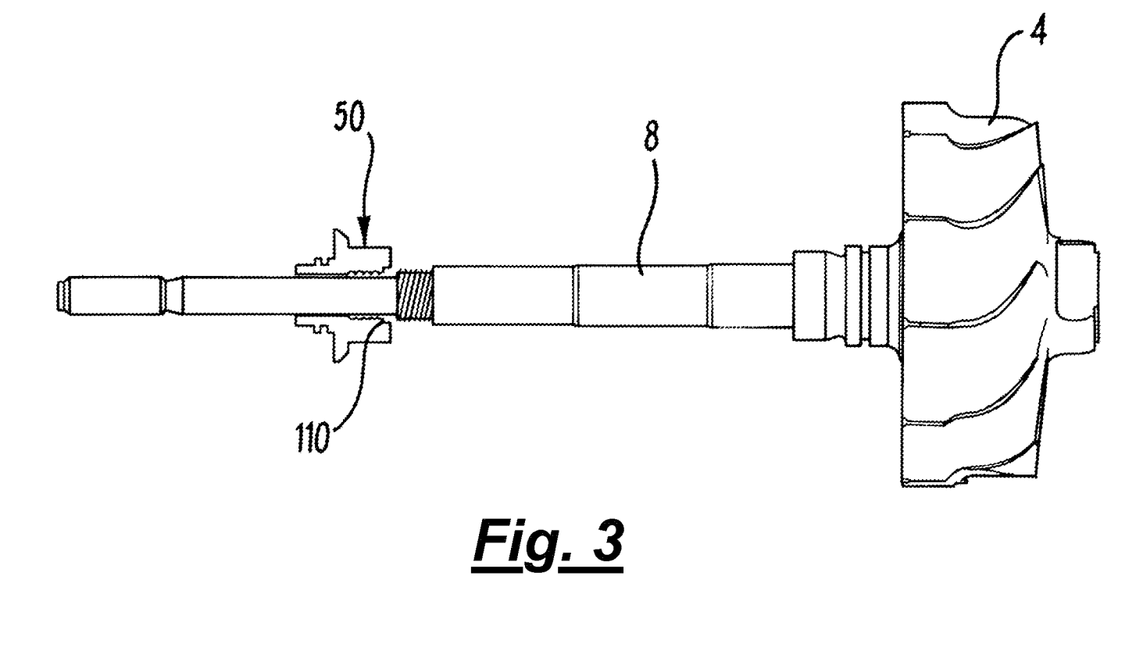
FIG. 3 is a side elevational view along the longitudinal axis of the turbocharger, showing a rotary shaft, turbine wheel and an oil slinger of the turbocharger, with the remainder of the turbocharger omitted for illustrative purposes and with the oil slinger shown in sectioned view along its longitudinal axis.

Specifically, oil that is flung radially outward from the oil slinger 50 hits the surfaces of the compressor back plate 29 that define the chamber 105 and runs down said surfaces to the drain 62 (see FIG. 2), where it then passes to the oil sump 104.

The first oil slinger 50 is generally annular and extends in an axial direction between first and second ends 51, 52. When mounted on the shaft 8, the first end 51 of the oil slinger 50 passes through the bore 28 in the compressor housing backplate 29 and terminates at a rear surface of the compressor impeller wheel 6.

Specifically, a first section of the first oil slinger 50, between the between the annular projection 53 (see below) and the first end 51 of the oil slinger 50 is received within the bore 28 in the compressor housing backplate 29. The inner surface that defines said bore 28 forms a close radial fit with said section of the first oil slinger 50.

This is advantageous in that the close radial fit prevents lubricating oil passing through the compressor back plate 29 and into the compressor housing. The close radial fit forms a non-contact seal.

The first oil slinger 50 is provided with a sealing arrangement to provide a seal between the first oil slinger 50 and the radially adjacent inner surface of the compressor back plate 29 that defines the bore 28, in which first oil slinger 50 rotates. The first oil slinger 50 is provided with a substantially annular groove 70 (see FIG. 2), which receives a sealing ring (not shown). The sealing ring is housed within the groove 70 and forms a seal with the radially adjacent inner surface of the compressor back plate 29 that defines the bore 28. Alternatively, in a reciprocal arrangement, the annular groove 70 may be provided in the compressor back plate 29.

The sealing arrangement is provided between the annular projection 53 (see below) and the first end 51 of the oil slinger 50.

A radially inner surface of the thrust plate 34 defines a central circular aperture 35 that extends axially between the radial faces of the plate and is designed for receipt of the first oil slinger 50. A second section of the first oil slinger 50, between the between the annular projection 53 (see below) and the second end 52 of the oil slinger 50 passes through the aperture 35 in the thrust plate 34.

The inner surface of the thrust plate 34 provides an annular sealing surface that forms a close radial fit with the outer surface of the first oil slinger 50, so as to provide a non-contact seal. Accordingly, the thrust plate 34 acts to prevent oil from passing from the bearing assembly 13, through thrust plate 34.

In this respect, on the bearing side, an annular recess 36 in the radial surface of the plate 34 effectively enlarges the aperture 35 in the radial direction. The recess 36 does not extend across the full axial extent of the plate 34 thus leaving a narrow land 37 on the inner periphery of the plate 34. The land 37 defines an annular sealing surface 38 that is positioned in close proximity to part of the outer surface of the first oil slinger 50 so as to provide a non-contact seal.

The first oil slinger 50 is provided with an annular projection 53 which acts to propel oil away from the shaft 8 as it rotates. The annular projection 53 extends radially outward from an outer surface of the first oil slinger 50 and is disposed approximately half way along the length of the first oil slinger. The respective outer surfaces of the first oil slinger 50 either side of the projection 53 are generally parallel to the axis of the first oil slinger 50. The section of the outer surface of the first oil slinger between the projection and the second end 52 of the first oil slinger 50 is of greater diameter than the outer surface of the first oil slinger 50 between the first end 51 of the first oil slinger 50 and the projection 53.

The projection 53 comprises first and second surfaces that face the first and second ends 51, 52 of the first oil slinger 50 respectively. The first surface is substantially perpendicular to the axis of the first oil slinger 50. The second surface of the projection 53 connects the distal end of the first surface of the projection 53 to the adjacent outer surface of the first oil slinger 50 and is chamfered to form a substantially convex surface.

An inner surface of the first oil slinger 50 defines a bore 54 that extends from the first end 51 to the second end 52 of the first oil slinger 50. The bore 54 has a step increase in diameter towards the second end of the first oil slinger to accommodate the step increase in diameter of the shaft 8.

The inner surface of the first oil slinger 50 is provided with a threaded section 101 that is engageable with the threaded section 56 of the shaft 8. The first oil slinger 50 is screw mounted onto the threaded section 56 of the shaft 8. The inner race 40 of the bearing assembly 13 is provided between the second end of the first oil slinger 50 and the shoulder 55 of the turboshaft 8. By virtue of this screw mounting, the first oil slinger 50 can be screwed along the threaded section 56 of the shaft 8, from a first position, in which it does not contact the bearing assembly 13, to a second position in which it acts to compress the bearing assembly 13 (shown in FIGS. 1 and 2). In the second position, the bearing assembly 13 is compressed between the second end 52 of the first oil slinger 50 and the shoulder 55 of the shaft 8. Specifically, in the second position, the second end 52 of the first oil slinger 50 is forced into abutment with the first end 99 of the inner race 40 of the bearing assembly 13. When the first oil slinger 50 is in the second position, it is rotationally fixed to the shaft 8 by virtue of its tight engagement with the shaft 8 and the bearing assembly 13.

The step increase in diameter of the bore 54 forms a generally annular shoulder 110. The annular lip 57 of the shaft 8 and the annular shoulder 110 form opposed surfaces. The annular lip 57 of the shaft 8 and the annular shoulder 110 form a limiting abutment to prevent the first oil slinger 50 being screwed along the threaded section of the shaft 8 past the second position. Accordingly this prevents the first oil slinger 50 from being over tightened on the shaft 8, thereby avoiding over compression of the bearing assembly 13. In the event that the first oil slinger 50 is over tightened, the abutment of the lip 57 and shoulder 110 acts to transfer the extra load to the shaft 8 rather than to the bearing assembly 13.

In addition, the step change in the diameter of the shaft 8 and bore 54 is advantageous in that it presents a tortuous, stepped, interface between the shaft 8 and bore 54, which acts to prevent oil from travelling along the interface, through the first oil slinger 50.

The above arrangement is advantageous in that the first oil slinger 50 can be used to preload the bearing assembly 13. This removes the need to tighten the impeller wheel nut 106 on the shaft 8, or the impeller wheel nut 106 can be tightened less, to achieve this preloading. Accordingly, the problem of unwanted axial extension of the shaft 8 and associated axial slip of the impeller wheel 6 during operation is avoided.

Furthermore, due to this clamping action, this allows the inner race 40 of the bearing assembly 13 to be rotationally fixed, relative to the shaft 8, by a transition fit between the inner race 40 of the bearing assembly 13 and the shaft 8.

This removes the need for an interference fit between the inner race 40 and the shaft 8. Accordingly, in order to disassemble the turbomachine, the first oil slinger 50 can be unscrewed from the shaft 8 and the shaft 8 can then be slid easily out of the bearing assembly without damaging the bearing assembly.

Although the invention is described in relation to a turbocharger it is to be understood that it has application to any sort of turbomachine. For example, the turbine may be used to drive any other suitable device other than a compressor including, for example, a generator.

It will be appreciated that numerous modifications to the above described design may be made without departing from the scope of the invention as defined in the appended claims.

For example, in the described embodiment, the second oil slinger 26 is integral with the shaft 8. However, it will be appreciated that it may be a separate component that is attachable to the shaft 8, for example by welding, an interference fit, or any other suitable means of attachment.

Furthermore, in the described embodiment the first oil slinger 50 directly contacts the bearing assembly 13 when it is in the second position, in order to apply a compressive force to the bearing assembly 13. However, it will be appreciated at least one intermediary member may be provided between the first oil slinger 50 and the bearing assembly 13 such that when the first oil slinger 50 is in the second position, the at least one intermediary member contacts the bearing assembly 13 and transmits the compressive force of the first oil slinger 50 to the bearing assembly 13.

In addition, in the described embodiment, the first oil slinger 50 contacts the inner race 40 of the bearing assembly 13, in order to apply a compressive force to the bearing assembly 13. However, it will be appreciated that the first oil slinger 50 may alternatively, or additionally, contact the outer race 41 of the bearing assembly 13, to apply a compressive force to the bearing assembly 13.

In the described embodiment, the lubricating fluid used in the turbocharger is oil. However, it will be appreciated that any suitable lubricating fluid may be used, with the first oil slinger 50 adapted for use with such a lubricating fluid.

In the described embodiment, the first oil slinger 50 is mounted on the shaft 8 between the compressor impeller wheel 6 and the bearing assembly 13 and the area of the compressor housing backplate 29 that surrounds the first oil slinger 50 is recessed to define an annular chamber 105 that captures the dispersed oil and includes a drain. Alternatively, the first oil slinger 50 may be provided at the other end of the shaft 8, i.e. between the bearing assembly 13 and the turbine wheel 4. In this case, the area of the housing (e.g. the bearing housing) that surrounds the first oil slinger 50 may be recessed to define an annular chamber that captures the dispersed oil and includes a drain.

It will be appreciated that the first fluid slinger may be provided at any suitable location, such that when it is in its second position it acts to compress the bearing assembly and accordingly different surrounding areas of a housing of the turbomachine may be recessed to define the annular chamber that captures the dispersed oil.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbomachine comprising:
a shaft rotatable about a rotational axis;
a turbine wheel provided at one end of the shaft for rotation about the rotational axis within a turbine housing, the shaft being supported for rotation in a bearing housing by a bearing assembly, the bearing housing having a bore through which the shaft extends, the bearing assembly being disposed in the bore;
a first lubricating fluid slinger arranged to rotate with the shaft and comprising a slinging formation arranged to propel a lubricating fluid away from the shaft as the shaft rotates, the shaft comprising a threaded section and the first lubricating fluid slinger comprising a screw thread that is engageable therewith such that the first lubricating fluid slinger is screwable along the threaded section of the shaft from a first position to a second position and wherein when the first lubricating fluid slinger is in the second position, it acts to compress the bearing assembly;
wherein the turbomachine further comprises a thrust plate arranged to restrain axial movement of the bearing assembly, wherein a radially inner surface of the thrust plate defines a bore through which the shaft passes and the first lubricating fluid slinger is mounted on the shaft such that a section of the first lubricating fluid slinger is received within the bore of the thrust plate and wherein the radially inner surface of the thrust plate that defines the bore forms a close radial fit with the first lubricating fluid slinger, and wherein at least a portion of the radially inner surface of the thrust plate is axially aligned with at least a portion of the threaded section of the shaft; and
wherein a compressor impeller wheel is mounted to the other end of the shaft for rotation about said axis, and wherein the turbomachine further comprises a compressor wheel nut which is threaded onto a second threaded section of the shaft, to constrain axial motion of the compressor impeller wheel along the shaft, and is screwable along said second threaded section of the shaft from a first position to a second position, and wherein when the compressor wheel nut is in the second position, it acts to compress the bearing assembly.

2. A turbomachine according to claim 1 wherein an area of the turbomachine that surrounds the first lubricating fluid slinger is recessed to define a chamber for capturing lubricating fluid that is propelled from the shaft by the first lubricating slinger and the chamber is fluidly connected by a drain to a lubricating fluid sump.

3. A turbomachine according to claim 1 wherein the first lubricating fluid slinger is provided with a sealing arrangement to provide a seal between the first lubricating fluid slinger and a radially adjacent surface of the turbomachine, within which the lubricating fluid slinger rotates.

4. A turbomachine according to claim 1 wherein when the lubricating fluid slinger is in the second position, the bearing assembly is rotationally fixed relative to the shaft by a transition fit.

5. A turbomachine according to claim 1 wherein the bearing assembly comprises inner and outer races radially separated by bearing elements and when the first lubricating fluid slinger is in the second position, it acts to compress the inner and/or outer race of the bearing assembly.

6. A turbomachine according to claim 5 wherein one of the inner or outer race of the bearing assembly is axially fixed relative to the bearing housing and when the first lubricating fluid slinger is in the second position, it acts to compress the other of the inner or outer race of the bearing assembly.

7. A turbomachine according to claim 1 wherein the slinging formation comprises a radially outward protrusion provided on an outer surface of the first lubricating fluid slinger.

8. A turbomachine according to claim 1 wherein the first lubricating fluid slinger comprises an internal bore for receiving the shaft and the bore is provided with said screw thread.

9. A turbomachine according to claim 8 wherein the shaft increases in diameter along its length to form a lip and the bore of the first lubricating fluid slinger increases in diameter along its length to form a shoulder, with the lip and shoulder forming a limiting abutment so as to prevent over compression of the bearing assembly by the first lubricating fluid slinger.

10. A turbomachine according to claim 1 wherein the turbomachine is a turbocharger.

11. A turbomachine according to claim 10 wherein a compressor housing back plate is provided between the bearing housing and the compressor impeller wheel, the compressor housing back plate has an inner surface which defines a bore, through which the shaft passes, wherein a section of the first lubricating fluid slinger is received within the bore and the inner surface that defines said bore forms a close radial fit with said section of the first lubricating fluid slinger.

12. A turbomachine according to claim 11 wherein an area of the compressor housing back plate that surrounds the first lubricating fluid slinger is recessed to define a chamber for capturing lubricating fluid that is propelled from the shaft by the first lubricating slinger and the chamber is fluidly connected by a drain to a lubricating fluid sump.

13. A turbomachine according to claim 1, further comprising a second lubricating fluid slinger, wherein the first lubricating fluid slinger is at one end of the bearing assembly and the second lubricating fluid slinger forms an abutment member at an opposite end of the bearing assembly that acts with the first lubricating fluid slinger to compress the bearing assembly when the first lubricating slinger is in the second position.

* * * * *